(12) United States Patent
Onozuka et al.

(10) Patent No.: US 8,773,244 B2
(45) Date of Patent: Jul. 8, 2014

(54) COMMUNICATION APPARATUS AND METHOD OF CONTROLLING ANTENNA CHARACTERISTICS

(75) Inventors: Katsuhiro Onozuka, Tokyo (JP); Kiyotada Yokogi, Tokyo (JP)

(73) Assignee: FeliCa Networks, Inc., Tokyo (JP)

( * ) Notice: Subject to any disclaimer, the term of this patent is extended or adjusted under 35 U.S.C. 154(b) by 604 days.

(21) Appl. No.: 12/430,382

(22) Filed: Apr. 27, 2009

(65) Prior Publication Data

US 2009/0273454 A1 Nov. 5, 2009

(30) Foreign Application Priority Data

Apr. 30, 2008 (JP) ................. 2008-119047

(51) Int. Cl.
 *H04Q 5/22* (2006.01)
 *G08B 23/00* (2006.01)
 *H04B 1/00* (2006.01)
 *H04B 5/00* (2006.01)

(52) U.S. Cl.
 USPC ....... 340/10.4; 340/10.2; 340/10.3; 340/10.6; 340/572.1; 340/572.7; 455/41.1; 455/68; 455/77; 455/126

(58) Field of Classification Search
 USPC .......... 340/10.1–10.6, 572.1–572.6; 343/741, 343/787, 876; 455/67.4, 70, 71, 77
 See application file for complete search history.

(56) References Cited

U.S. PATENT DOCUMENTS

| | | | |
|---|---|---|---|
| 5,438,699 A * | 8/1995 | Coveley .................... | 455/67.14 |
| 6,343,022 B1 * | 1/2002 | Naruse ............................ | 363/16 |
| 7,232,068 B2 * | 6/2007 | Uchiyama et al. ............ | 235/451 |
| 7,591,415 B2 * | 9/2009 | Jesme ........................... | 235/380 |
| 7,850,086 B2 * | 12/2010 | Nakane et al. ................ | 235/492 |
| 7,922,092 B2 * | 4/2011 | Uramoto ....................... | 235/492 |
| 8,149,120 B2 * | 4/2012 | Posamentier et al. ..... | 340/572.1 |
| 2007/0249398 A1 * | 10/2007 | Watanabe et al. ............. | 455/558 |

FOREIGN PATENT DOCUMENTS

| | | |
|---|---|---|
| JP | 05-128319 | 5/1993 |
| JP | 2004-240716 | 8/2004 |
| JP | 2005-073113 | 3/2005 |
| JP | 2006-238398 | 9/2006 |
| JP | 2006-270699 | 10/2006 |
| JP | 2006-279813 | 10/2006 |
| JP | 2007-074153 | 3/2007 |
| JP | 2008-017012 | 1/2008 |
| JP | 2008-147912 | 6/2008 |
| JP | 2007-293423 | 11/2008 |

OTHER PUBLICATIONS

Japanese Office Action for corresponding JP2008-119047 issued on Jun. 29, 2010.

* cited by examiner

*Primary Examiner* — Daniel Wu
*Assistant Examiner* — Mancil Littlejohn, Jr.
(74) *Attorney, Agent, or Firm* — K&L Gates LLP

(57) ABSTRACT

There is provided a communication apparatus including a voltage detection unit for detecting an antenna end voltage of a reader or a non-contact type IC card when non-contact communicating using a load modulation of the non-contact type IC card with respect to a magnetic field signal from the reader/writer; and a characteristics control unit for changing characteristics of the antenna of the reader/writer or the non-contact type IC card when the antenna end voltage detected by the voltage detection unit reaches a predetermined first threshold value.

13 Claims, 12 Drawing Sheets

COMMUNICATION APPARATUS AND METHOD OF CONTROLLING ANTENNA CHARACTERISTICS

CROSS REFERENCES TO RELATED APPLICATIONS

The present application claims priority to Japanese Patent Application JP 2008-119047 filed in the Japan Patent Office on Apr. 30, 2008, the entire contents of which being incorporated herein by reference.

BACKGROUND

The present application relates to a communication apparatus, and a method of controlling the antenna characteristics.

In recent years, mobile telephones and mobile information terminals mounted with a non-contact type IC (Integrated Circuit) card or a non-contact type IC chip, or communication apparatuses, information processing devices, or the like mounted with a reader/writer function for non-contact communicating with the non-contact type IC card are being widespread used. Such devices or equipments are hereinafter sometimes referred to as a non-contact communication apparatus. The reader/writer and the non-contact type IC card can perform proximity communication by respectively using a carrier wave of a specific frequency (e.g., 13.56 MHz). For instance, when a command for causing the non-contact type IC card to execute a predetermined process is transmitted by the reader/writer, the non-contact type IC card executes a process corresponding to the received command, and returns the execution result as a response signal.

In this case, the non-contact type IC card can transmit the signal using a modulation technique referred to as load modulation of performing modulation on the carrier wave by changing the load of the antenna according to the transmission data. However, the non-contact communication using the load modulation forms a non-communicable region (so-called NULL) in relation to the distance (hereinafter referred to as non-contact communication distance) between the reader/writer and the non-contact type IC card. Thus, development of a technique of preventing the formation of such non-communicable region is desired.

In this regards, a technique related to an information processing device for reading out information recorded on the non-contact type IC card is disclosed in Japanese Patent Application Laid-Open No. 2004-240716 (hereinafter referred to as document 1). This technique relates to a technique of, after transmitting a command to the non-contact type IC card, changing an output impedance of a transmission unit according to the information responded by the non-contact type IC card with respect to the relevant command. The document 1 also describes a technique of changing the output impedance of the transmission unit when the response of the non-contact type IC card is not received. This technique is contrived in anticipation of the effect of avoiding the formation of the null, which is formed according to the non-contact communication distance.

In another example, a technique related to a communication apparatus for performing a short distance communication with the reader/writer is disclosed in Japanese Patent Application Laid-Open No. 2006-238398 (hereinafter referred to as document 2). This technique has one feature in estimating the distance between the communication apparatus and the reader/writer, and shifting the tuning frequency according to the estimated value. This technique also detects the reception level to estimate the distance between the communication apparatus and the reader/writer. Furthermore, this technique relates to a technique of using a capacitor for tuning the frequency of the signal, and selectively switching the tuning frequency by switching the connection of other capacitors connected in parallel to the relevant capacitor with a switch. This technique is contrived in an anticipation of the effect of avoiding the formation of the null, which is formed according to the non-contact communication distance.

In another example, a technique related to a reader/writer for performing a short distance communication with the communication terminal through a carrier wave is disclosed in Japanese Patent Application Laid-Open No. 2007-74153 (hereinafter referred to as document 3). This technique has one feature in receiving a synthesized wave of the carrier wave and the modulation signal from the communication terminal, and performing a control to attenuate the carrier wave according to the detection result of the modulation component contained in the synthesized wave. The document 3 also describes a configuration of arranging an auxiliary antenna for outputting a signal that counteracts the carrier wave. This technique aims to avoid the formation of the null corresponding to the non-contact communication distance.

In another example, a technique related to a communication apparatus for performing a short distance communication with the reader/writer, similar to document 2, is disclosed in Japanese Patent Application Laid-Open No. 2006-279813 (hereinafter referred to as document 4). This technique has one feature in estimating the distance between the communication apparatus and the reader/writer, and shifting the tuning frequency according to the estimated value. This technique also relates to a technique of detecting the impedance of a resistance connected to a means for tuning the frequency of the signal, and estimating the distance according to the change in impedance when estimating the distance between the communication apparatus and the reader/writer. This technique aims to avoid the formation of the null corresponding to the non-contact communication distance.

SUMMARY

However, although the technique of preventing the formation of the null by switching the communication distance at which the null is formed is disclosed in each document above, the timing of switching is not clearly described. Furthermore, each document above does not take into consideration the possibility the signal intensity greatly lowers by switching the non-contact communication distance at which the null is formed. Therefore, even if such techniques are used alone or simply combined and applied, the communicable distance itself becomes extremely short by switching the non-contact communication distance at which the null is formed, whereby the possibility of becoming in a communication disabled state is not denied.

Such communication disabled state may occur as a result of the load of the non-contact type IC card seen from the reader/writer at a predetermined frequency not changing even if reply is sent with the load on the card side switched when the non-contact communication distance reaches the vicinity of a predetermined value. The communication disabled state may also occur as a result of distortion being generated at the waveform due to degradation in the balance of the sub-carrier wave used in sending a reply from the non-contact type IC card, and the wave not being detected. The communication disabled state may also result from insufficiency in power transmission.

Some of the documents described above address the null formed when change in impedance at the antenna end of the reader/writer is eliminated due to coupling between the antennas. However, the formation of the null caused by the distortion of the transmission/reception waveform and the lack of power transmission is not mentioned in any document. Furthermore, the method described in each document above shifts the resonance frequency (f0), which may possibly become an adverse effect on the null caused by waveform distortion and lack of output magnetic field intensity.

The present application addresses the above-identified, and other issues associated with conventional methods and apparatuses, and desirably provides a new and improved communication apparatus capable avoiding the formation of the null by controlling the timing of switching antenna characteristics based on a predetermined threshold value so as to maintain a loose coupling state without depending on the distance between the antennas and so as to prevent the antenna characteristics (tuning frequency and Q value) from changing as much as possible; and a method of controlling the antenna characteristics.

In order to solve the above issue, according to an embodiment, there is provided a communication apparatus that non-contact communicates using the load modulation of a non-contact IC card with respect to the magnetic field signal from a reader/writer. The communication apparatus includes a voltage detection unit for detecting an antenna end voltage of the reader or the non-contact type IC card; and a characteristics control unit for changing characteristics of the antenna of the reader/writer or the non-contact type IC card according to the antenna end voltage detected by the voltage detection unit. The characteristics control unit changes the characteristics of the antenna when the antenna end voltage reaches a predetermined first threshold value.

The communication apparatus non-contact communicates using the load modulation of the non-contact type IC card with respect to the magnetic field signal from the reader/writer. The communication apparatus detects the antenna end voltage of the reader/writer or the non-contact type IC card by means of the voltage detection unit. The communication apparatus also changes the characteristics of the antenna of the reader/writer or the non-contact type IC card according to the antenna end voltage detected by the voltage detection unit by means of the characteristics control unit. Furthermore, the communication apparatus changes the characteristics of the antenna when the antenna end voltage reaches the predetermined first threshold value by means of the characteristics control unit.

The characteristics control unit may be configured to restore the characteristics of the antenna to a state before change when the antenna end voltage reaches a predetermined second threshold value after changing the characteristics of the antenna when the antenna end voltage reaches the predetermined first threshold value.

The predetermined second threshold value may be set to a value distant from the predetermined first threshold value than the antenna end voltage immediately after the characteristics of the antenna are changed by the characteristics control unit.

The predetermined first threshold value may be set to a value distant from the predetermined second threshold value than the antenna end voltage immediately after the characteristics of the antenna are restored to the state before change by the characteristics control unit.

The predetermined first threshold value may be set to a value of the antenna end voltage in which the amount of $|\Delta|$ change $|\Delta|$ is $|\Delta|>0$ within a range the amount of change $|\Delta|$ at a predetermined frequency of a magnetic field absorption value that changes according to the load modulation of the antenna becomes smaller as the antenna end voltage approaches the predetermined first threshold value.

The communication apparatus may further include a switch for adding a resistance to the antenna. The characteristics control unit may be configured to change the characteristics of the antenna by switching ON/OFF of the switch.

The communication apparatus may further include a plurality of switches, independent from each other, for adding a plurality of resistances in parallel to the antenna. The characteristics control unit may be configured to change the characteristics of the antenna by switching ON/OFF some or all of the plurality of switches such that the antenna end voltage does not reach the predetermined second threshold value immediately after the characteristics of the antenna are changed when the antenna end voltage reaches the predetermined first threshold value.

The communication apparatus may further include a plurality of switches, independent from each other, for adding a plurality of resistances in parallel to the antenna. The characteristics control unit may be configured to change the characteristics of the antenna by switching ON/OFF some or all of the plurality of switches when the antenna end voltage reaches the predetermined second threshold value immediately after the characteristics of the antenna are changed when the antenna end voltage reaches the predetermined first threshold value.

The characteristics control unit may determine whether or not to change the characteristics of the antenna at an arbitrary timing, and change the characteristics of the antenna at a timing transmission and reception of data are not being performed when determining to change.

The characteristics control unit may change the characteristics of the antenna when the antenna end voltage is greater than the predetermined first threshold value, or restore the characteristics of the antenna to the state before change when the antenna end voltage is smaller than the predetermined second threshold value. In this case, the communication apparatus may be the non-contact type IC card.

The characteristics control unit may change the characteristics of the antenna when the antenna end voltage is smaller than the predetermined first threshold value, or restore the characteristics of the antenna to the state before change when the antenna end voltage is greater than the predetermined second threshold value. In this case, the communication apparatus may be the reader/writer.

In order to solve the above issue, according to an embodiment, there is provided a method of controlling antenna characteristics, the method including the steps of: detecting an antenna end voltage of a reader or a non-contact type IC card when communicating using a load modulation of the non-contact type IC card with respect to a magnetic field signal from the reader/writer; and controlling characteristics of the antenna of the reader/writer or the non-contact type IC card when the antenna end voltage detected in the voltage detecting step reaches a predetermined threshold value.

According to the above configuration, the non-communicable region formed when the non-contact communication distance reaches the vicinity of a predetermined value can be avoided. At the same time, a predetermined threshold value may be provided according to the antenna end voltage that changes in response to the switching of the antenna characteristics, and the switch timing of the antenna characteristics may be controlled according to the threshold value, so that extreme lowering of the communicable distance due to the switching of the antenna characteristics can be avoided. As a result, the formation of the non-communicable region can be avoided while maintaining the communicable distance to greater than or equal to a certain value.

According to an embodiment, the formation of the null can be avoided through control of the timing of switching the antenna characteristics based on the predetermined threshold value by maintaining the loosely coupled state without dependent on the distance between the antennas and not changing the antenna characteristics (tuning frequency and Q value) as much as possible.

Additional features and advantages are described herein, and will be apparent from the following Detailed Description and the figures.

DETAILED DESCRIPTION

The present application will be described in detail with reference to the appended drawings according to an embodiment.

An embodiment of the present application will be described. The present embodiment relates to a communication apparatus for performing a non-contact communication, and in particular, relates to a technique of detecting an antenna end voltage, and avoiding the formation of a non-communicable region by changing the antenna characteristics according to the detection result. Such technique has one feature in that the antenna characteristics are controlled based on a predetermined threshold value.

[Function Configuration of Communication Apparatus 100]

Figure 1:
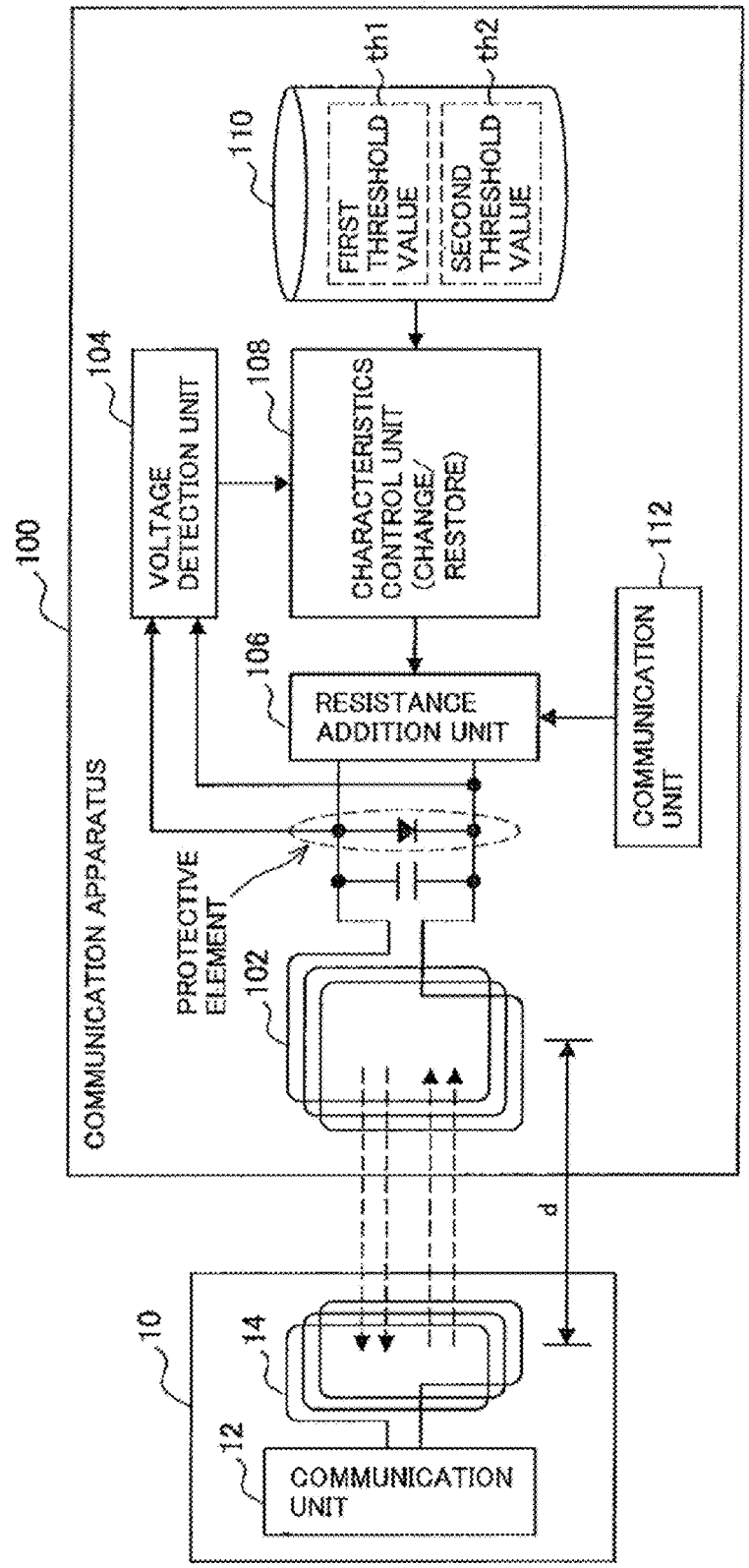
FIG. 1 is an explanatory diagram showing a function configuration of a communication apparatus according to one embodiment.

First, the function configuration of the communication apparatus 100 according to the present embodiment will be described with reference to FIG. 1. FIG. 1 is an explanatory diagram showing the function configuration of the communication apparatus 100 according to the present embodiment.

As shown in FIG. 1, the communication apparatus 100 is mainly configured by an antenna 102, a voltage detection unit 104, a resistance addition unit 106, a characteristics control unit 108, a storage unit 110, and a communication unit 112. For instance, the communication apparatus 100 can carry out non-contact communication with another communication apparatus 10 equipped with a communication unit 12 and an antenna 14.

In addition, a protective element is shown in the communication apparatus 100 of FIG. 1. The protective element protects circuits inside the apparatus when the voltage input from the antenna end is high. The protective element may be a ballista, zener diode, surge protection circuit, or the like. However, the communication apparatus 100 according to the present embodiment may not be arranged with the protective element due to the configuration of the characteristics control unit 108 to be hereinafter described. In this case, the circuit configuration is simplified by not arranging the protective element, and furthermore, the circuit area and the manufacturing cost are reduced.

The distance d between the antenna 102 of the communication apparatus 100 and the antenna 14 of another communication apparatus 10 is hereinafter referred to as a non-contact communication distance. The communication apparatus 100 is configured by a non-contact type IC card, and the like. The other communication apparatus 10, on the other hand, is configured by a reader/writer capable of communicating with the non-contact type IC card.

(Voltage Detection Unit 104)

The voltage detection unit 104 is a unit for detecting the antenna end voltage of the antenna 102. The voltage detection unit 104 detects the antenna end voltage of the antenna 102 when the communication apparatus 100 receives carrier wave or modulation wave via the antenna 102. The antenna end voltage detected by the voltage detection unit 104 is input to the characteristics control unit 108.

(Resistance Addition Unit 106)

The resistance addition unit 106 is a unit for changing the load of the antenna 102. The resistance addition unit 106 adds resistance to the antenna 102 or deletes the added resistance in response to a control signal input from the characteristics control unit 108 to switch the load of the antenna 102. That is, the resistance addition unit 106 is a changing unit for changing the characteristics of the antenna 102. The resistance addition unit 106 switches the load of the antenna in response to a return signal acquired from the communication unit 112, and modulates the magnetic field generated from the antenna 102. The return signal is transmitted by the modulated magnetic field. Here, the return signal refers to a signal returned in response to a transmission signal transmitted from the other communication apparatus 10.

The resistance addition unit 106 performs the switching of the load for transmitting the return signal, or increase/decrease of load for changing the characteristics of the antenna 102 by load modulation. When transmitting the return signal, the resistance addition unit 106 turns ON/OFF the load having a predetermined resistance value, switches the impedance by the capacity connected to the end of the antenna 102, and transmits the return signal. When performing increase/decrease of the load for changing the characteristics of the antenna 102, the resistance addition unit 106 increases/decreases the magnitude of the load connected in parallel to the capacity to change the frequency characteristics of the impedance by the relevant capacity.

(Characteristics Control Unit 108, Storage Unit 110)

The characteristics control unit 108 is a control unit for controlling the characteristics of the antenna 102 according to the antenna end voltage of the antenna 102 detected by the voltage detection unit 104. In particular, the characteristics control unit 108 controls the characteristics of the antenna 102 based on one or a plurality of threshold values recorded in the storage unit 110. In this case, the characteristics control unit 108 controls the characteristics of the antenna 102 by increasing/decreasing the resistance value of the antenna 102 by the resistance addition unit 106. The storage unit 110 is recorded with one or a plurality of threshold values (e.g., first threshold value th1, second threshold value th2) in advance. Such threshold values will be hereinafter described.

(Communication Unit 112)

The communication unit 112 is a unit for generating the return signal, and transmitting a signal by controlling the resistance addition unit 106 according to the relevant return signal. For instance, the communication unit 112 can periodically change the intensity of the magnetic field generated from the antenna 102 by repeatedly switching the load of the antenna 102 through the resistance addition unit 106. Thus, the communication unit 112 can perform signal modulation of ASK (Amplitude Shift Keying) scheme on the carrier wave by switching the load of the antenna 102.

(Regarding Cause of Formation of Non-Communicable Region)

Figure 2A:
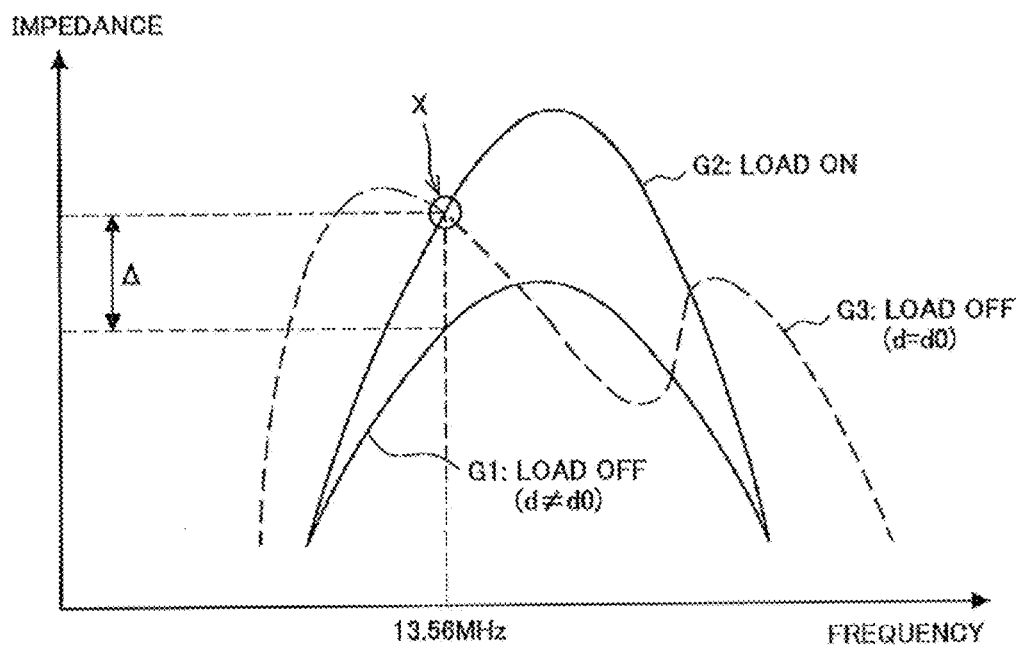
FIG. 2A is an explanatory diagram for explaining the cause of formation of a non-communicable region.

The cause of formation of the non-communicable region will be briefly described below with reference to FIG. 2A. FIG. 2A is an explanatory diagram for explaining the cause of formation of the non-communicable region. FIGS. 2B to 2F will be appropriately referenced in the following description. These figures are explanatory diagrams for explaining the relationship between the non-contact communication distance d and the cause of formation of the null. In the following description, assume the communication apparatus 100 is the non-contact type IC card, and the other communication apparatus 10 is the reader/writer for the sake of convenience of the explanation. It should be recognized that the technique according to the present embodiment is not limited thereto, and is suitably applied to apparatuses that non-contact communicate with each other.

As described above, a pair of communication apparatuses (e.g., reader/writer and non-contact type IC card) that non-contact communicate with each other communicate using the coupling (electromagnetic coupling) between the respective antennas. For instance, a load modulation of changing the frequency characteristics of the impedance seen from the reader/writer side and the Q value related to the characteristics by switching ON/OFF the load added in parallel to the antenna of the non-contact type IC card, and returning the signal is adopted. The switching ON/OFF of the load is realized by adding or deleting the resistance in parallel to the antenna.

When the non-contact communication distance d become short, the antennas of both apparatuses closely couple, and thus the frequency characteristics of the impedance seen from the reader/writer side greatly change. The non-communicable region forms due to such change. One example of such state is schematically shown in FIG. 2A. The Q value is a value representing the sharpness of the peak of the frequency characteristics of the impedance.

FIG. 2A schematically shows G2, which represents a state in which the load added to the antenna 102 of the non-contact type IC card is turned ON, and G1 and G3, which represent a state in which the load is turned OFF. G1 to G3 are frequency characteristics of the impedance seen from the reader/writer side. As shown in FIG. 2A, the Q value of the frequency characteristics of the impedance seen from the reader/writer side becomes larger when the load of the non-contact type IC card is turned ON (G2). The Q value of the frequency characteristics of the impedance seen from the reader/writer side becomes smaller when the load of the non-contact type IC card is turned OFF (G1).

As apparent from FIG. 2A, comparing G2 of when the load is ON and G1 of when the load is OFF, a difference Δ is detected in the impedance value at a certain frequency (e.g., 13.56 MHz). The non-contact type IC card and the reader/writer thus realize the non-contact communication by the load modulation scheme using the difference Δ in the impedance value. If the non-contact communication distance d becomes sufficiently short, as described above, the shape of the frequency characteristics of the impedance may be distorted or shift in the frequency axis direction. For instance, the shape may shift in the frequency axis direction such that the center frequency of the frequency characteristics of the impedance becomes larger as the non-contact communication distance d becomes shorter. The null may form from such change.

Therefore, when the antenna 14 and the antenna 102 are loosely coupled (when non-contact communication distance d is relatively large), the shape of G1 is obtained in the load OFF state. In this case, the difference Δ in impedance at a predetermined frequency (e.g., 13.56 MHz) becomes |Δ|>0 between G2 of the load ON state and G1 of the load OFF state, and the signal modulated with the ASK scheme can be received by the reader/writer.

When the non-contact communication distance d approaches the vicinity of a predetermined distance d0, the difference Δ in impedance at a predetermined frequency becomes substantially zero between G2 of the load ON state and G3 of the load OFF state. Thus, change does not appear in the impedance detected by the reader/writer even if the load of the antenna 102 is switched, and the non-contact type IC card does not modulate the signal with the ASK scheme and return the signal.

As a result, the non-communicable region forms in the vicinity of the predetermined non-contact communication distance d0. The causes of the formation of the non-communicable region have other factors in addition to the above. The causes of the formation of the null including the causes described above will now be described with reference to FIGS. 2B to 2F.

Figure 2B:
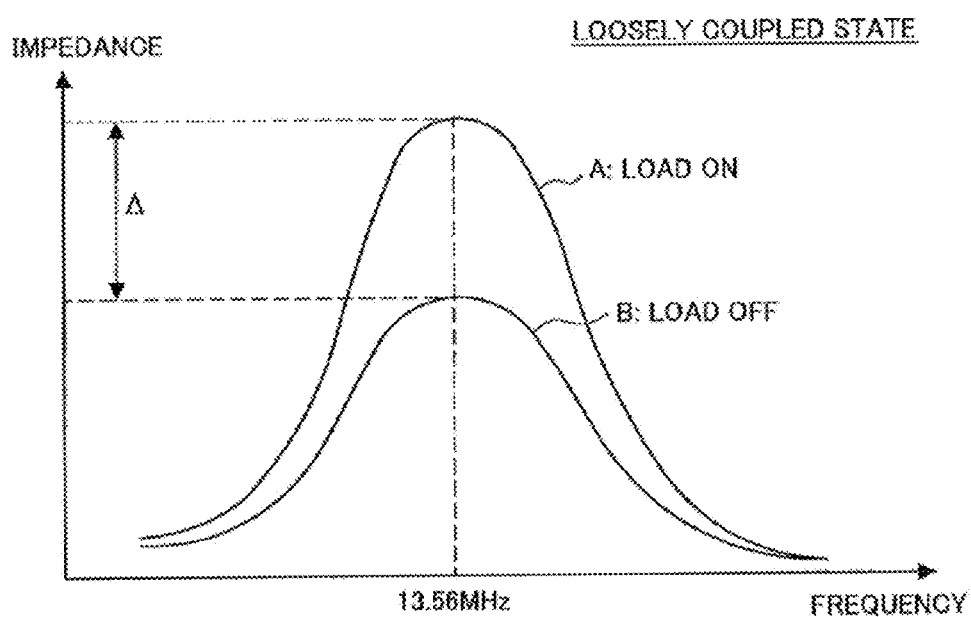
FIG. 2B is an explanatory diagram for explaining the cause of formation of the non-communicable region.

First, FIG. 2B will be referenced. FIG. 2B schematically shows the frequency characteristics of the impedance seen from the reader/writer side when the antennas of the non-contact type IC card and the reader/writer are in a loosely coupled state. As described above, the Q value of the frequency characteristics of the impedance seen from the reader/writer side increases/decreases when the load of the non-contact type IC card is turned ON (A)/OFF (B). Thus, the return signal from the non-contact type IC card can be demodulated by detecting the change in impedance value at a predetermined frequency (hereinafter assumed as 13.56 MHz).

Figure 2C:
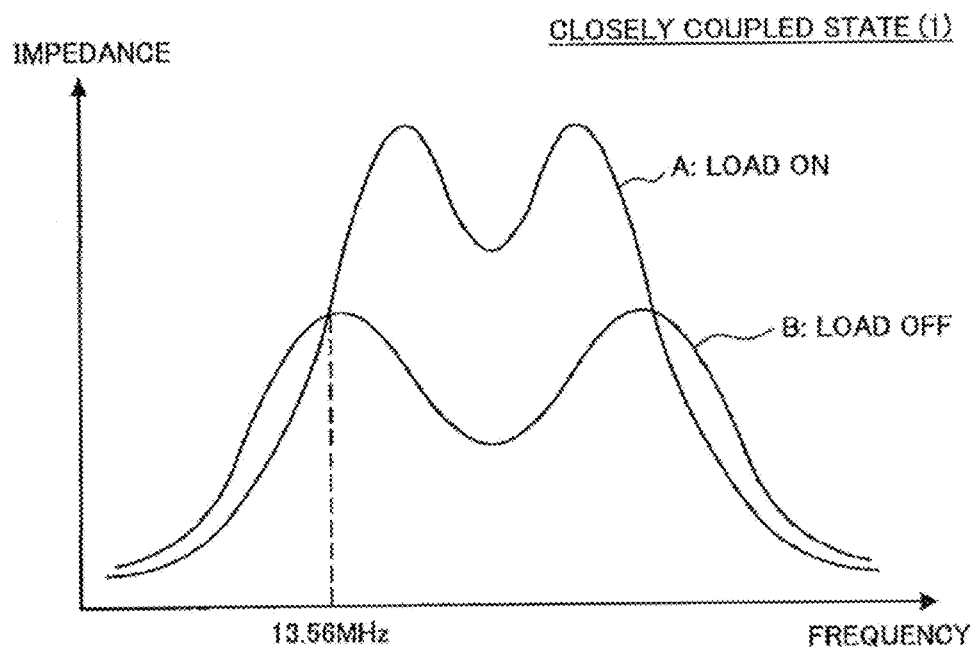
FIG. 2C is an explanatory diagram for explaining the cause of formation of the non-communicable region.

FIG. 2C will now be referenced. FIG. 2C schematically shows the frequency characteristics of the impedance seen from the reader/writer side when the antennas of the non-contact type IC card and the reader/writer are in a closely coupled state. As described above, when the antennas are closely coupled, the shape of the frequency characteristics of the impedance distorts, and the center frequency shifts to the high frequency side. As shown in FIG. 2C, the frequency characteristics of the impedance may have a shape of double peak.

In this case, as shown in FIG. 2C, the impedance value of the load ON (A) and the impedance value of the load OFF (B) take substantially the same value at the frequency of 13.56 MHz used in the detection of the return signal, and the return signal is not demodulated. This is one cause of the formation of the null described with reference to FIG. 2A.

Figure 2D:
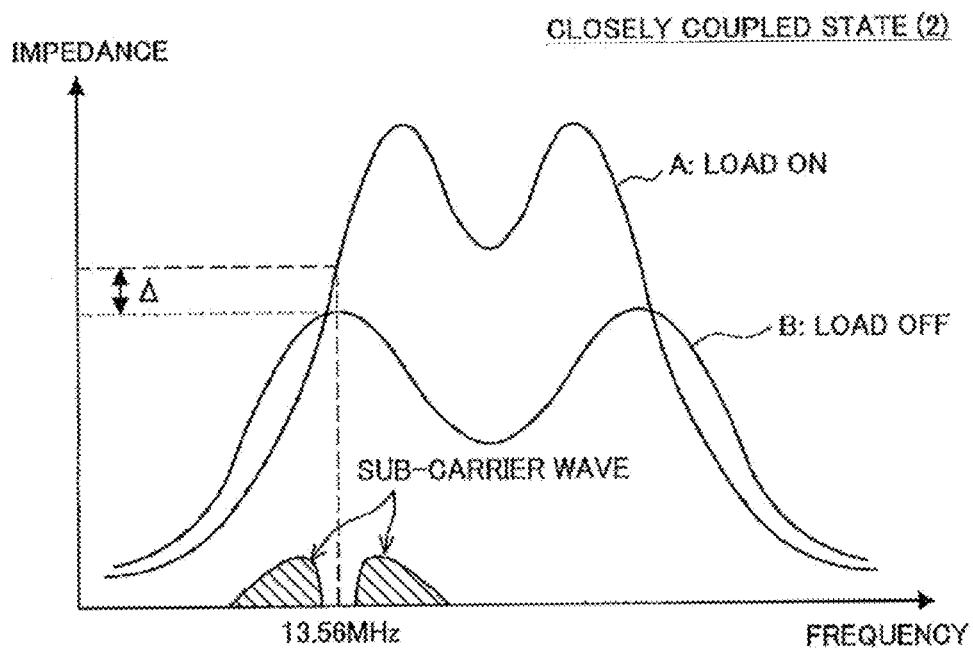
FIG. 2D is an explanatory diagram for explaining the cause of formation of the non-communicable region.
Figure 2E:
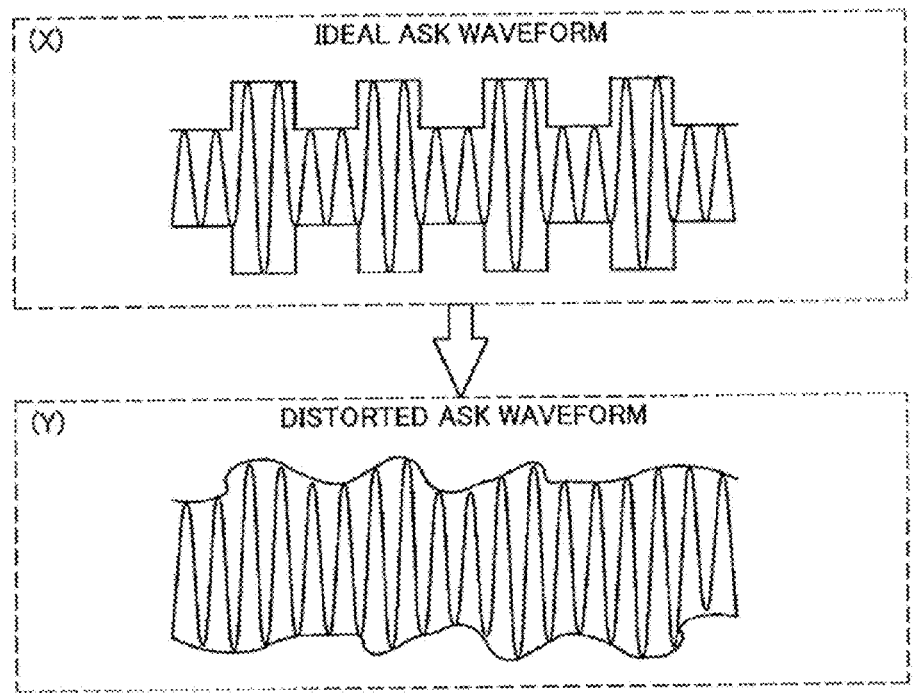
FIG. 2E is an explanatory diagram for explaining the cause of formation of the non-communicable region.

FIGS. 2D and 2E will now be referenced. FIG. 2D schematically shows the frequency characteristics of the impedance seen from the reader/writer side when the antennas of the non-contact type IC card and the reader/writer are in a closely coupled state. FIG. 2E is an explanatory diagram schematically showing the ASK waveform detected on the reader/writer side. In FIG. 2D, the sub-carrier wave is described in addition to the frequency characteristics of the impedance seen from the reader/writer side. The sub-carrier wave is used when returning the signal from the non-contact type IC card. For instance, the sub-carrier wave is set symmetrically at positions of ±212 KHz with 13.56 MHz as the center.

In the case of FIG. 2D, a finite difference Δ exists in the impedance value between the frequency characteristics of the impedance of load ON (A) and the frequency characteristics of the impedance of load OFF (B) at 13.56 MHz, and thus it appears as if the return signal can be demodulated. However, the shape of the frequency characteristics is significantly asymmetric in a sub-carrier wave band set symmetric to both sides of 13.56 MHz, and the balance of the sub-carrier wave is affected. FIG. 2E(Y) shows the ASK waveform when the balance of the sub-carrier wave is affected.

FIG. 2E shows an ideal ASK waveform (X) and a distorted ASK waveform (Y). The ideal ASK waveform (X) is an ASK waveform detected when the frequency characteristics of the impedance in the two sub-carrier wave bands are symmetric as in the frequency characteristics of the impedance shown in FIG. 2B. The distorted ASK waveform (Y) is an ASK waveform detected when the frequency characteristics of the impedance are significantly asymmetric in the two sub-carrier wave bands, as shown in FIG. 2D. The reader/writer does not demodulate the return signal from the distorted ASK waveform (Y), and thus the state becomes the non-communicable state. This is one cause of the formation of the null.

Figure 2F:
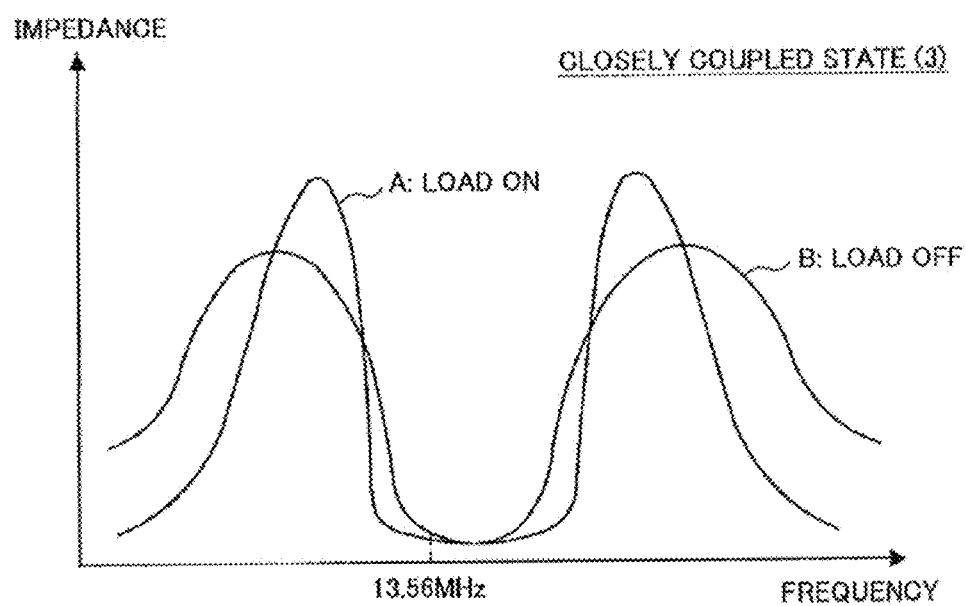
FIG. 2F is an explanatory diagram for explaining the cause of formation of the non-communicable region.

FIG. 2F will now be referenced. The frequency characteristics of the impedance seen from the reader/writer side when the antennas of the non-contact type IC card and the reader/writer are in a closely coupled state are shown. FIG. 2F shows a case where the coupling between the antennas is significantly strong. When the coupling becomes significantly strong, the mutual inductance component between the antennas becomes large, and the power amount transmitted to the non-contact type IC card is greatly reduced. Therefore, the power transmission becomes insufficient, and the state becomes the non-communicable state. This is one cause of the formation of the null. Furthermore, if the coupling is significantly strong, the change in the impedance value due to ON/OFF of the load may not appear, similar to FIG. 2C, which may become the cause of the null.

With regards to the issue that the non-communicable region forms by the magnetic coupling between the antenna of the non-contact type IC card and the antenna of the reader/writer, countermeasure such as setting the resonance frequency (f0) of the antenna 102 of the non-contact type IC card at a position distant from the carrier wave frequency is taken. However, the cause of the formation of the null described in FIGS. 2D to 2F is difficult to overcome with the countermeasure of shifting the resonance frequency, and may conversely degrade the characteristics. Thus, a solution effective to any of the above issues is proposed in the present embodiment.

The present embodiment relates to a technique of suitably controlling the characteristics of the antenna 102 based on one or a plurality of threshold values set in advance. This technique will be described in detail below.

(Regarding Method of Setting Threshold Value)

The method of setting the threshold value according to the present embodiment will be described with reference to FIGS. 3 to 6. FIGS. 3 to 6 are explanatory diagrams showing the method of setting the threshold value according to the present embodiment. Here, the method of setting two threshold values (first threshold value, second threshold value) will be described for convenience of explanation, but the present embodiment is not limited thereto.

Figure 3:
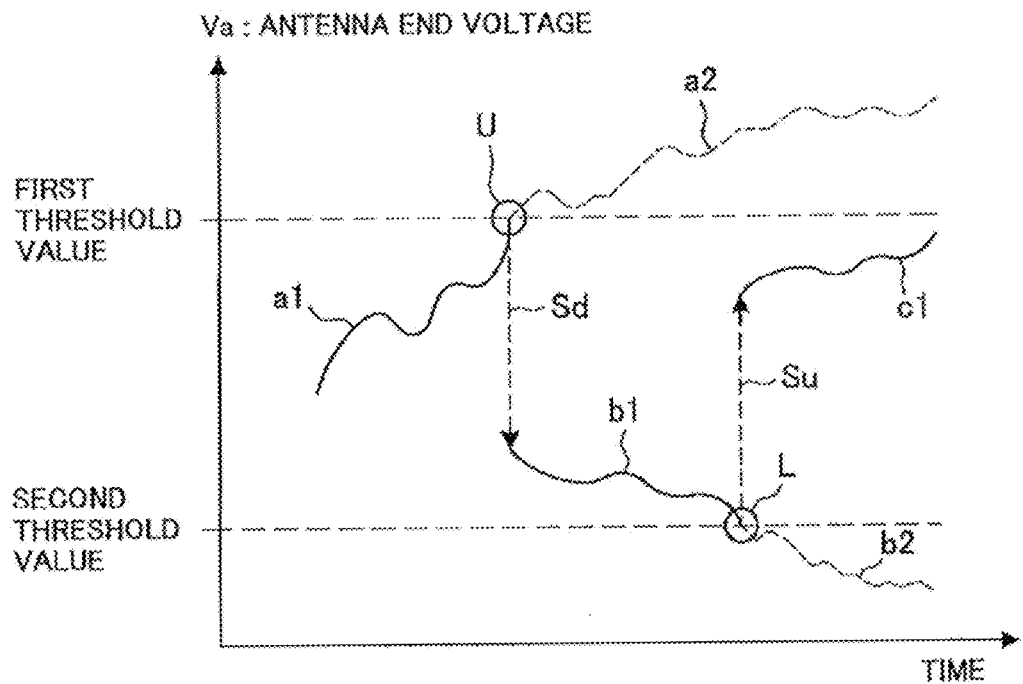
FIG. 3 is an explanatory diagram showing a characteristics switching method corresponding to the antenna end voltage.

(FIG. 3: Regarding Load Control Method on Non-Contact Type IC Card Side)

First, the load control method on the non-contact type IC card side will be described with reference to FIG. 3. FIG. 3 is an explanatory diagram showing the change in the antenna end voltage at the non-contact type IC card (communication apparatus 100) and a set example of the threshold value.

As shown in FIG. 3($a1$), the antenna end voltage Va increases as the non-contact communication distance d becomes smaller. The communication apparatus 100 detects the antenna end voltage Va by means of the voltage detection unit 104. When the antenna end voltage Va reaches the first threshold value (reference symbol U), the characteristics control unit 108 increases the load of the antenna 102 through the resistance addition unit 106. The antenna end voltage Va then lowers by a predetermined width Sd.

The antenna end voltage Va will continue to increase unless the load is increased, as shown in FIG. 3($a2$). However, overvoltage state is not obtained as the antenna end voltage Va is suppressed to smaller than or equal to the first threshold value by the increase in load, and the protective element is unnecessary.

As previously described, the impedance by the capacity connected to the antenna end changes when the load connected in parallel to the capacity is increased/decreased. That is, the frequency characteristics (see FIG. 2A etc.) of the impedance seen from the opposing reader/writer side changes by the increase/decrease of the load connected in parallel to the capacity on the non-contact type IC card side. For instance, if the load is large, the influence on the impedance by the capacity of the non-contact type IC card becomes small, and the influence on the impedance by the resonance system on the non-contact type IC card side becomes small. Thus, when the load is increased, the amount of shift of the peak and the amount of change in the Q value by the inter-antenna coupling of the frequency characteristics of the impedance seen from the reader/writer side are suppressed. As a result, the state of the frequency characteristics of the impedance as shown in FIGS. 2C, 2D, and 2D can be avoided.

The predetermined width Sd is a value determined by the impedances of the peripheral circuits etc. including the antenna 102. Therefore, the predetermined width can be estimated in advance by theoretical calculation, experiment, or the like. The increase in load of the antenna 102 by the characteristics control unit 108 has substantially the same effect as increasing the non-contact communication distance d. It should be recognized that when referring to increase in load, it means increasing the load connected in parallel to the load turned ON/OFF by the load modulation.

If the non-contact communication distance d is increased after the load of the antenna 102 is increased by the characteristics control unit 108, the antenna end voltage Va lowers as shown in FIG. 3(b1). When the antenna end voltage Va reaches the second threshold value (reference symbol L), the characteristics control unit 108 decreases the load of the antenna 102 through the resistance addition unit 106. The antenna end voltage Va then increases by a predetermined width Su. The antenna end voltage Va will continue to lower unless the load is decreased, as shown in FIG. 3(b2). However, the antenna end voltage Va is maintained at greater than or equal to the second threshold value by the decrease in the load. As a result, lack of power transmission does not occur.

The predetermined width Su is a value determined by the impedances of the peripheral circuits etc. including the antenna 102, similar to the predetermined width Sd, and thus can be estimated in advance by theoretical calculation, experiment, or the like. The decrease in load of the antenna 102 by the characteristics control unit 108 has substantially the same effect as reducing the non-contact communication distance d. It should be recognized that when referring to decrease in load, it means decreasing the load connected in parallel to the load turned ON/OFF by the load modulation.

If the non-contact communication distance d is reduced after decreasing the load of the antenna 102 by the characteristics control unit 108, the antenna end voltage Va increases as shown in FIG. 3(c1). The communication apparatus 100 on the reception side thus detects the antenna end voltage Va that changes according to the non-contact communication distance d, and changes the load of the antenna 102 at the stage the antenna end voltage Va reaches a predetermined threshold value to thereby avoid formation of the non-communicable region.

It is important that the first threshold value is set to a value smaller than the antenna end voltage in the non-communicable region. The formation of the non-communicable region can be avoided by such setting. The second threshold value is set to a value larger than the antenna end voltage at which a predetermined maximum communicable distance can be ensured. The maximum communicable distance can be maintained by setting the second threshold value in such manner. That is, the formation of the non-communicable region can be avoided while maintaining the maximum communicable distance by setting the first and the second threshold values in the above manner.

Figure 4:
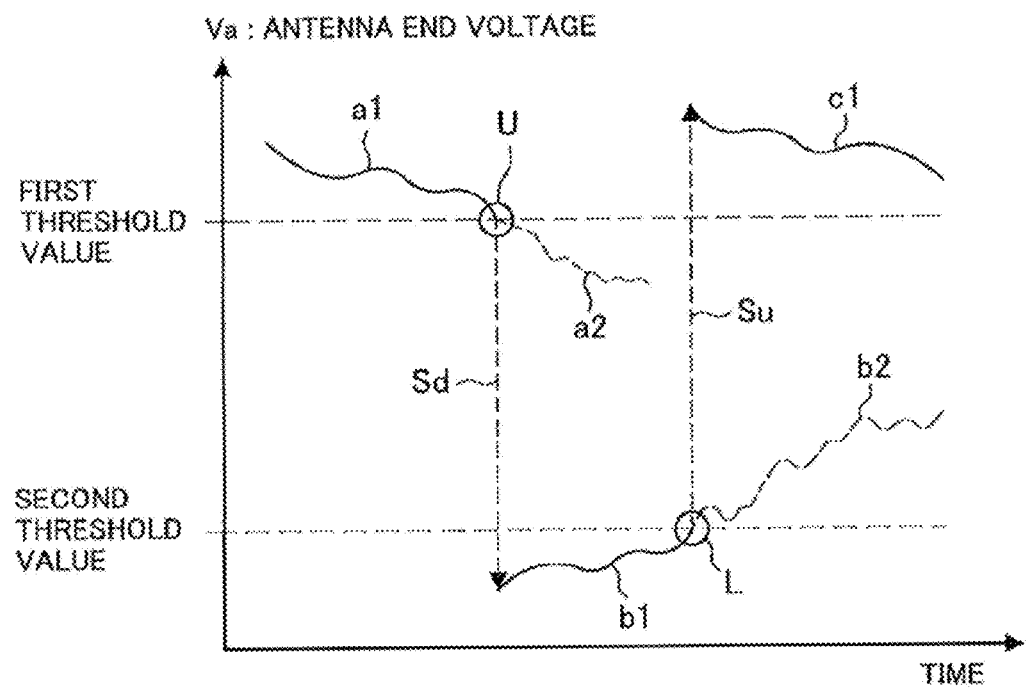
FIG. 4 is an explanatory diagram showing a characteristics switching method corresponding to the antenna end voltage.

(FIG. 4: Regarding Load Control Method on Reader/Writer Side)

The load control method on the reader/writer side will now be described with reference to FIG. 4. FIG. 4 is an explanatory diagram showing change in the antenna end voltage on the reader/writer side and a set example of the threshold value. The reader/writer is assumed to have the function configuration of the communication apparatus 100.

The load control method described with reference to FIG. 3 is a method of controlling the load on the non-contact type IC card side so that the antenna end voltage Va is between the first threshold value and the second threshold value. This method can be applied even to the method of controlling the load on the reader/writer side. FIG. 4 is an explanatory diagram for describing the method of controlling the load on the reader/writer side in relation to such application. It should be recognized that the antenna end voltage Va shown in FIG. 4 is the antenna end voltage seen from the reader/writer side. The influence of the increase/decrease of the load on the frequency characteristics of the impedance is as described above, where the shape of the frequency characteristics of the impedance can be similarly changed to prevent the formation of the null even when controlling the load on the reader/writer side.

As shown in FIG. 4(a1), the antenna end voltage Va on the reader/writer side lowers as the non-contact communication distance d becomes smaller. The reader/writer (communication apparatus 100) detects the antenna end voltage Va by means of the voltage detection unit 104. When the antenna end voltage Va reaches the first threshold value (reference symbol U), the characteristics control unit 108 increases the load of the antenna 102 through the resistance addition unit 106. The antenna end voltage Va then lowers by the predetermined width Sd. The predetermined width Sd is a value determined by the impedances of the peripheral circuits etc. including the antenna 102. Therefore, the predetermined width can be estimated in advance by theoretical calculation, experiment, or the like. The antenna end voltage Va will continue to lower unless the load is increased, as shown in FIG. 4(a2). However, the antenna end voltage Va does not reach between the first threshold value and the second threshold value due to the increase in load.

If the non-contact communication distance d is increased after the load of the antenna 102 is increased by the characteristics control unit 108, the antenna end voltage Va increases as shown in FIG. 4(b1). When the antenna end voltage Va reaches the second threshold value (reference symbol L), the characteristics control unit 108 decreases the load of the antenna 102 through the resistance addition unit 106. The antenna end voltage Va then increases by a predetermined width Su. The predetermined width Su is a value determined by the impedances of the peripheral circuits etc. including the antenna 102, similar to the predetermined width Sd, and thus can be estimated in advance by theoretical calculation, experiment, or the like. The antenna end voltage Va will continue to increase unless the load is decreased, as shown in FIG. 4(b2). However, the antenna end voltage Va does not reach between the first threshold value and the second threshold value due to the decrease in load.

If the non-contact communication distance d is reduced after decreasing the load of the antenna 102 by the characteristics control unit 108, the antenna end voltage Va lowers as shown in FIG. 4(c1). The communication apparatus 100 thus detects the antenna end voltage Va that changes according to the non-contact communication distance d, and changes the load of the antenna 102 at the stage the antenna end voltage Va reaches a predetermined threshold value. In this case, it is important that the antenna end voltage Va is controlled so as not to be positioned between the first threshold value and the second threshold value, where formation of the non-communicable region is prevented by such control.

The second threshold value is set to a value smaller than the antenna end voltage at which the maximum communicable distance when the load is turned ON can be ensured. The maximum communicable distance when the load is turned OFF can be maintained by such setting. That is, the formation of the non-communicable region can be avoided while maintaining the maximum communicable distance.

Figure 5:
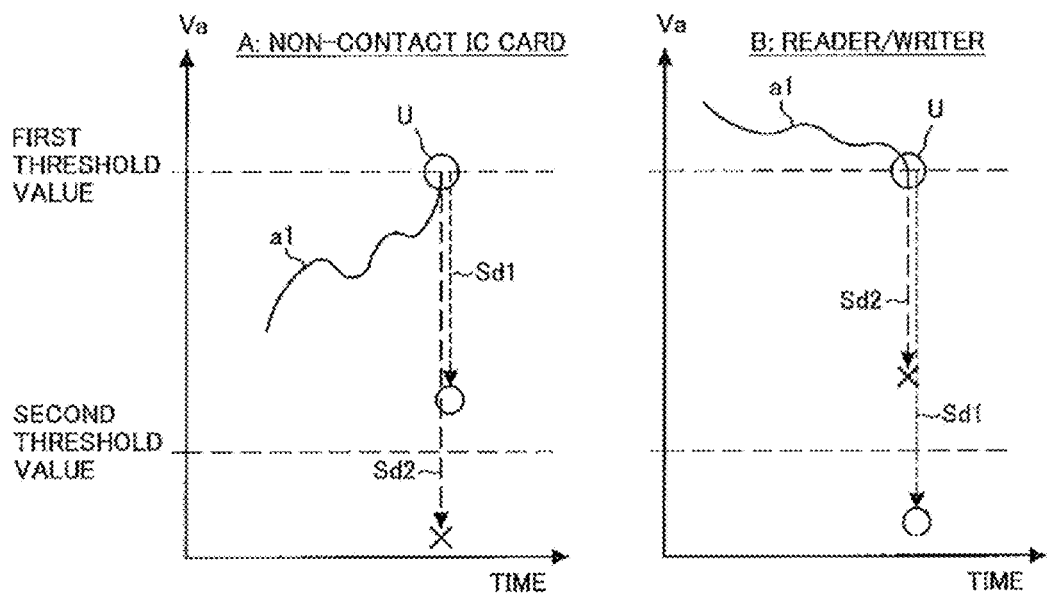
FIG. 5 is an explanatory diagram showing a characteristics switching method corresponding to the antenna end voltage.

(FIG. 5: Regarding Method of Setting Second Threshold Value)

The method of setting the second threshold value will now be described with reference to FIG. 5. FIG. 5(A) is an explanatory diagram showing a method of setting the second threshold value on the non-contact type IC card side (correspond to FIG. 3). FIG. 5(B) is an explanatory diagram showing a method of setting the second threshold value on the reader/writer side (correspond to FIG. 4).

As described above, the characteristics control unit 108 changes the load of the antenna 102 to switch the antenna characteristics when the antenna end voltage Va reaches the first threshold value. As a result, the antenna end voltage Va changes immediately after the antenna characteristics are switched.

In the case of FIG. 5(A), the load is increased and the antenna end voltage Va of the non-contact type IC card is lowered by the predetermined width (Sd1 or Sd2). If the predetermined width is Sd2, the antenna end voltage Va becomes lower than the second threshold value immediately after the switching of the antenna characteristics. If set such that the antenna characteristics (decrease of load) are switched immediately after reaching the second threshold value as shown in FIG. 3, the load is increased after reaching the first threshold value, and immediately after the antenna characteristics are switched, the load is again decreased to return to the original state. Thus, the predetermined width is set so as to be maintained at a value of greater than or equal to the second threshold value even after the load is increased as with Sd1. The second threshold value may be set according to the magnitude of the load to be increased/decreased. Thus, the maximum communicable distance can be maintained as long as the predetermined width is maintained at a value of greater than or equal to the second threshold value such as Sd1.

Similarly, in the case of FIG. 5(B), the load is increased and the antenna end voltage Va of the reader/writer is lowered by the predetermined width (Sd1 or Sd2). If the predetermined width is Sd2, the antenna end voltage Va becomes greater than the second threshold value immediately after the switching of the antenna characteristics. If set such that the antenna characteristics are switched to the original state immediately after the antenna end voltage Va becomes between the first threshold value and the second threshold value as shown in FIG. 4, the load is increased after reaching the first threshold value, and immediately after the antenna characteristics are switched, the load is again decreased to return to the original state. Thus, the predetermined width is set so as to be maintained at a value of smaller than the second threshold value even after the load is increased as with Sd1. The second threshold value may be set according to the magnitude of the load to be increased/decreased. Thus, the maximum communicable distance can be maintained as long as the predetermined width is maintained at a value of smaller than the second threshold value such as Sd1.

Figure 6:
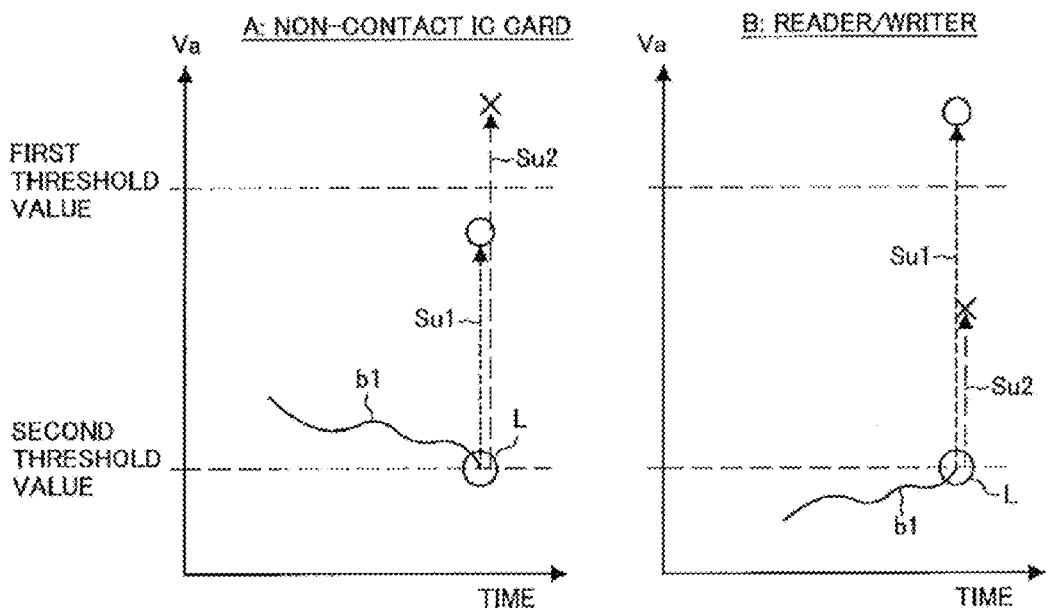
FIG. 6 is an explanatory diagram showing a characteristics switching method corresponding to the antenna end voltage.

(FIG. 6: Regarding Method of Setting First Threshold Value)

The method of setting the first threshold value will now be described with reference to FIG. 6. FIG. 6(A) is an explanatory diagram showing a method of setting the first threshold value on the non-contact type IC card side (correspond to FIG. 3). FIG. 6(B) is an explanatory diagram showing a method of setting the first threshold value on the reader/writer side (correspond to FIG. 4).

As described above, the characteristics control unit 108 changes the load of the antenna 102 to switch the antenna characteristics when the antenna end voltage Va reaches the second threshold value. As a result, the antenna end voltage Va changes immediately after the antenna characteristics are switched.

In the case of FIG. 6(A), the load is decreased, and the antenna end voltage Va of the non-contact type IC card is increased by the predetermined width (Su1 or Su2). If the predetermined width is Su2, the antenna end voltage Va becomes greater than the first threshold value immediately after switching the antenna characteristics, whereby the non-communicable region forms. The formation of the non-communicable region can be avoided if the predetermined width is maintained at a value of smaller than or equal to the first threshold value such as Su1. Thus, the first threshold value is set to a value smaller than the antenna end voltage Va at which the non-communicable region forms.

Similarly, in the case of FIG. 6(B), the load is decreased, and the antenna end voltage Va of the reader/writer is increased by the predetermined width (Su1 or Su2). If the predetermined width is Su2, the antenna end voltage Va becomes smaller than the first threshold value immediately after switching the antenna characteristics, whereby the non-communicable region forms. The formation of the non-communicable region can be avoided if the predetermined width is maintained at a value of greater than or equal to the first threshold value such as Su1. Thus, the first threshold value is set to a value greater than the antenna end voltage Va at which the non-communicable region forms.

(FIGS. 5, 6: Regarding Load Control Method)

As described with reference to FIGS. 5 and 6, the first threshold value is set so as to avoid the formation of the non-communicable region, and the second threshold value is set so that the maximum communicable distance becomes greater than or equal to a predetermined value. Such threshold values are determined by the circuit configuration, and the like of the non-contact type IC card and the reader/writer. Thus, the formation of the non-communicable region can be avoided while maintaining the maximum communicable distance to greater than or equal to the predetermined value by setting the first and the second threshold values to suitable values as shown in FIG. 3 or FIG. 4.

However, the antenna end voltage Va immediately after the antenna characteristics are changed has a possibility of transitioning as with the predetermined widths Sd2, Su2 shown in FIG. 5 or FIG. 6 depending on the circuit configuration of the non-contact type IC card and the reader/writer, the combination of both devices, and the like. In this case, the characteristics control unit 108 can respond by restoring the antenna characteristics to the state before change. However, if the antenna characteristics are restored, the threshold value is again exceeded, and the process of again changing the antenna characteristics is repeated, whereby a possibility of being in a vibration state (or oscillation state) arises. With respect to such possibility, the characteristics control unit 108 may have a reset function of restoring the antenna characteristics to the state before change and fixing such state if vibrated over predetermined number of times.

Specific Configuration Example of Resistance Addition Unit 106, Characteristics Control Unit 108, Etc.

An example of a specific circuit configuration of the resistance addition unit 106, the characteristics control unit 108, and the like arranged in the communication apparatus 100 will be described with reference to FIGS. 7 to 10.

Figure 7:
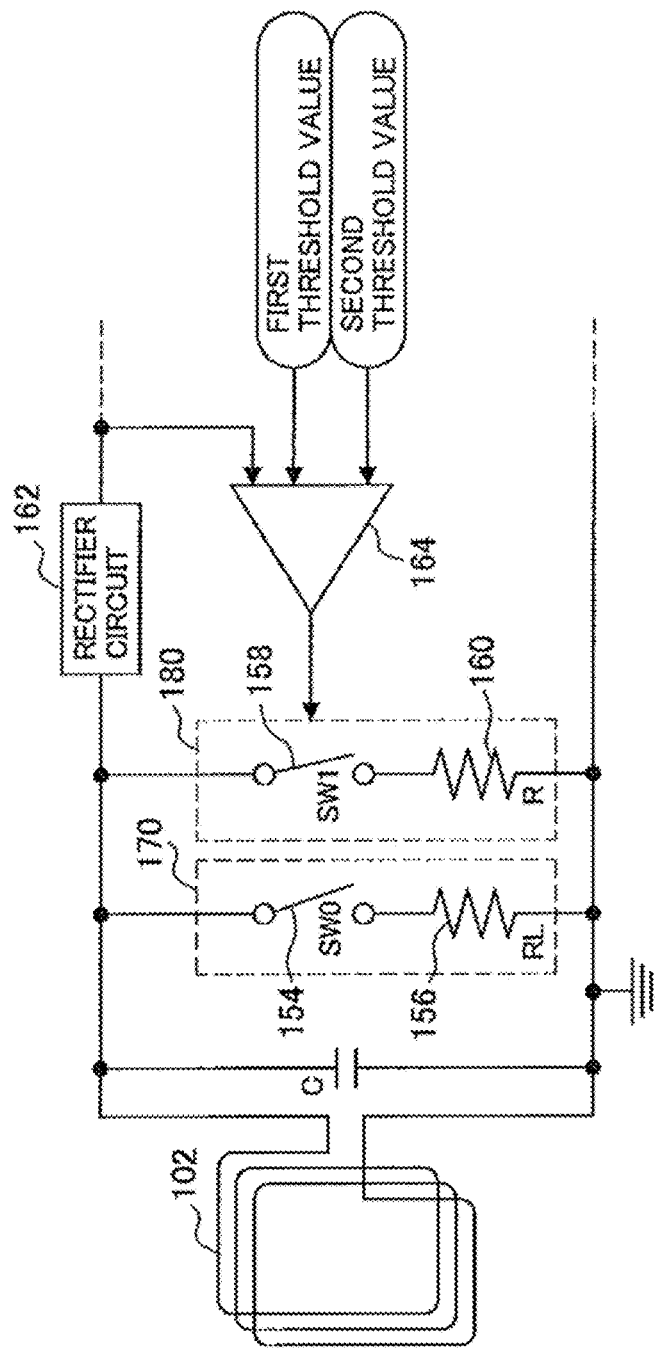
FIG. 7 is an explanatory diagram showing a circuit configuration example of the communication apparatus according to an embodiment.

FIG. 7: Circuit Configuration Example on Transmission Side

FIG. 7 is an explanatory diagram showing a specific circuit configuration example of the resistance addition unit 106, the characteristics control unit 108, and the like arranged in the communication apparatus 100 on the reception side. The circuit configuration is one example of a load control circuit in the communication apparatus 100 using the feedback of the antenna end voltage. This circuit configuration will be referred to as load control circuit below.

As shown in FIG. 7, the load control circuit according to the present embodiment includes a load modulation block 170, a characteristics control block 180, a rectifier circuit 162, and a comparator 164.

(Load Modulation Block 170)

The load modulation block 170 is a unit corresponding to one function of the resistance addition unit 106 for transmitting a signal by performing a load modulation according to the signal input by the communication unit 112. The load modulation block 170 is configured by a switch 154, and a resistance 156. The switch 154 and the resistance 156 are connected in series. The switch 154 is switched to ON/OFF in response to the signal input by the communication unit 112, so that the load of the antenna 102 can be modulated by the resistance 156. Thus, the signal modulation of ASK scheme is realized using the change in the antenna characteristics corresponding to the switching of the switch 154.

(Characteristics Control Block 180, Comparator 164)

The characteristics control block 180 is a unit corresponding to one function of the resistance addition unit 106 for switching the antenna characteristics according to the input signal by the comparator 164. The characteristics control block 180 is configured by a switch 158 and a resistance 160. A capacitor may be used in place of the resistance 160. The switch 158 and the resistance 160 are connected in series. Furthermore, the characteristics control block 180 is connected in parallel to the load modulation block 170.

The comparator 164 is one example of the characteristics control unit 108. The comparator 164 first compares the antenna end voltage converted to direct current by the rectifier circuit 162 and the first threshold value, and switches the switch 158 to ON when the antenna end voltage reaches the first threshold value (reference symbol U of FIG. 3). When the switch 158 is turned ON, the load of the antenna 102 is increased by the addition of the resistance 160, and the antenna characteristics change (reference symbol Sd of FIG. 3). The comparator 164 then compares the antenna end voltage input by the rectifier circuit 162 and the second threshold value, and switches the switch 158 to OFF when the antenna end voltage reaches the second threshold value (reference symbol L of FIG. 3). When the switch 158 is turned OFF, the load of the antenna 102 is decreased by the separation of the resistance 160, and the antenna characteristics change (reference symbol Su of FIG. 3).

Figure 8:
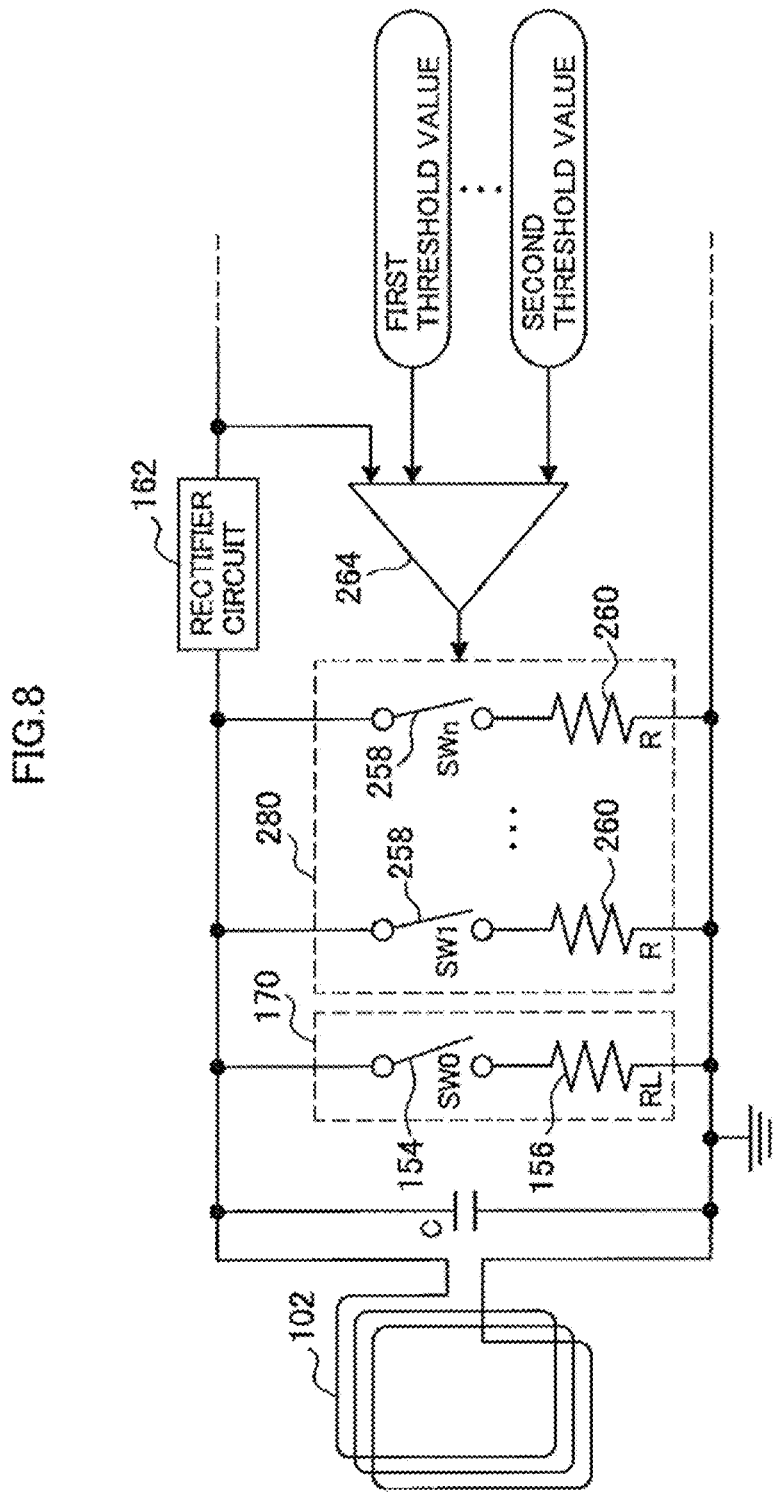
FIG. 8 is an explanatory diagram showing a circuit configuration example of the communication apparatus according to an embodiment.

(FIG. 8: Variant)

The load control circuit of multi-stage parallel resistance type will be described as a variant of the load control circuit according to the present embodiment with reference to FIG. 8. FIG. 8 is an explanatory diagram showing a variant of the load control circuit according to the present embodiment. Same reference numerals are denoted on the components substantially the same as the configuration of FIG. 7, and detailed description will be omitted to avoid redundant explanation.

As shown in FIG. 8, the load control circuit according to the present variant includes the load modulation block 170, a characteristics control block 280, the rectifier circuit 162, and a comparator 264. The difference with the above load control circuit mainly lies in the difference in the configuration of the characteristics control block 280 and the comparator 264.

(Characteristics Control Block 280, Comparator 264)

The characteristics control block 280 is configured by a plurality of switches 258 (SW1 to SWn) and a plurality of resistances 260. One resistance 260 is connected in series to one switch 258. A set of the switch 258 and the resistance 260 is connected in parallel to each other. Thus, the amount of load to be added to the antenna 102 can be adjusted by changing the number of switch 258 to turn ON.

For instance, as shown in FIG. 5(A) or FIG. 6(A), when reaching one threshold value and exceeding the other threshold value immediately after the antenna characteristics are switched, the issue of again exceeding the former threshold value can be avoided by switching only some of the plurality of switches 258 that are turned ON to OFF. Alternatively, the number of switches 258 to turn ON can be gradually increased until immediately before reaching the other threshold value so as not to exceed the other threshold value when reaching the former threshold value.

The comparator 264 compares the antenna end voltage input from the rectifier circuit 162 with two or more plurality of threshold values (first threshold value to $n^{th}$ threshold value), and determines the number of switch 258 to switch ON so that the antenna end voltage after the switching of the antenna characteristics is positioned between the predetermined threshold values. The plurality of switches 258 may be switched in a predetermined order, or may be switched in an arbitrary order. For instance, when the resistance values of the plurality of resistances 260 differ from each other, the load of the antenna can be more efficiently switched by appropriately controlling the combination of switching the switches 258.

As described above, the load control circuit according to the present embodiment is realized by combining the switch 158, 258, the resistance 160, 260, and the comparator 164, 264. The load control of the antenna 102 is realized mainly by switching the switch 158, 258 in response to the signal input from the comparator 164, 264. In this case, the comparator 164, 264 controls the switch 158, 258 based on the control method described with reference to FIGS. 3, 5(A), and 6(A).

Specific Example 1

Specific Example Related to FIG. 7

Consider a case where the communication apparatus 100 on the reception side is the non-contact type IC card, and the transmission side is the reader/writer. In this case, the switch 158 is switched from OFF to ON and the resistance 160 is validated when the antenna end voltage of the non-contact type IC card exceeds the first threshold value. As a result, the antennas are closely coupled and the occurrence of the non-communicable state is avoided even if the non-contact type IC card and the reader/writer are positioned at close range. Furthermore, when the antenna end voltage becomes smaller than the second threshold value, the non-contact type IC card invalidates the resistance 160 by switching the switch 158 to OFF. As a result, the maximum communicable distance is prevented from becoming lower than the predetermined value due to degradation of the communication state that occurs by the increase in the load of the antenna.

Specific Example 2

Specific Example Related to FIG. 8

Similar to the specific example 1, consider a case where the communication apparatus 100 on the reception side is the non-contact type IC card and the transmission side is the reader/writer. In this case, a plurality of sets of the switches 258 and the resistances 260 are connected in parallel at multi-stages. Thus, the non-contact type IC card monitors the antenna end voltage, and switches the switches 258 so as to be at the resistance value corresponding to the relevant antenna end voltage. For instance, greater number of switches may be switched to ON as the non-contact type IC card becomes closer to the reader/writer and the magnetic field becomes stronger. The load can be increased as the resistance value on the antenna 102 becomes smaller by the number of switches 258 that are turned ON.

The circuit configuration example on the transmission side will now be described.

Figure 9:
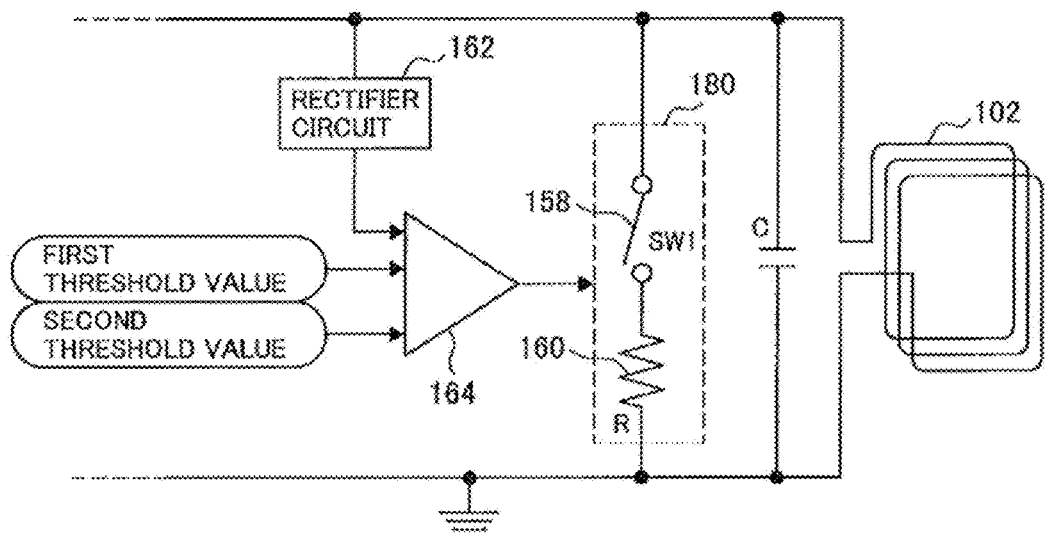
FIG. 9 is an explanatory diagram showing a circuit configuration example of the communication apparatus according to an embodiment.

FIG. 9: Circuit Configuration Example on Transmission Side

FIG. 9 is an explanatory diagram showing a specific circuit configuration example of the resistance addition unit 106, the characteristics control unit 108, and the like arranged in the communication apparatus 100 on the transmission side. The circuit configuration is one example of a load control circuit in the communication apparatus 100 using the feedback of the antenna end voltage.

As shown in FIG. 9, the load control circuit according to the present embodiment includes the characteristics control block 180, the rectifier circuit 162, and the comparator 164.

(Characteristics Control Block 180, Comparator 164)

The characteristics control block 180 is a unit corresponding to one function of the resistance addition unit 106 for switching the antenna characteristics according to the input signal by the comparator 164. The characteristics control block 180 is configured by the switch 158 and the resistance 160. A capacitor may be used in place of the resistance 160. The switch 158 and the resistance 160 are connected in series. Furthermore, the characteristics control block 180 is connected in parallel to the load modulation block 170.

The comparator 164 is one example of the characteristics control unit 108. The comparator 164 first compares the antenna end voltage converted to direct current by the rectifier circuit 162 and the first threshold value, and switches the switch 158 to OFF when the antenna end voltage reaches the first threshold value (reference symbol U of FIG. 4). When the switch 158 is turned OFF, the load of the antenna 102 is increased by the removal of the resistance 160, and the antenna characteristics change (reference symbol Sd of FIG. 4). The comparator 164 then compares the antenna end voltage input by the rectifier circuit 162 and the second threshold value, and switches the switch 158 to ON when the antenna end voltage reaches the second threshold value (reference symbol L of FIG. 4). When the switch 158 is turned ON, the load of the antenna 102 is decreased by the addition of the resistance 160, and the antenna characteristics change (reference symbol Su of FIG. 4).

Figure 10:
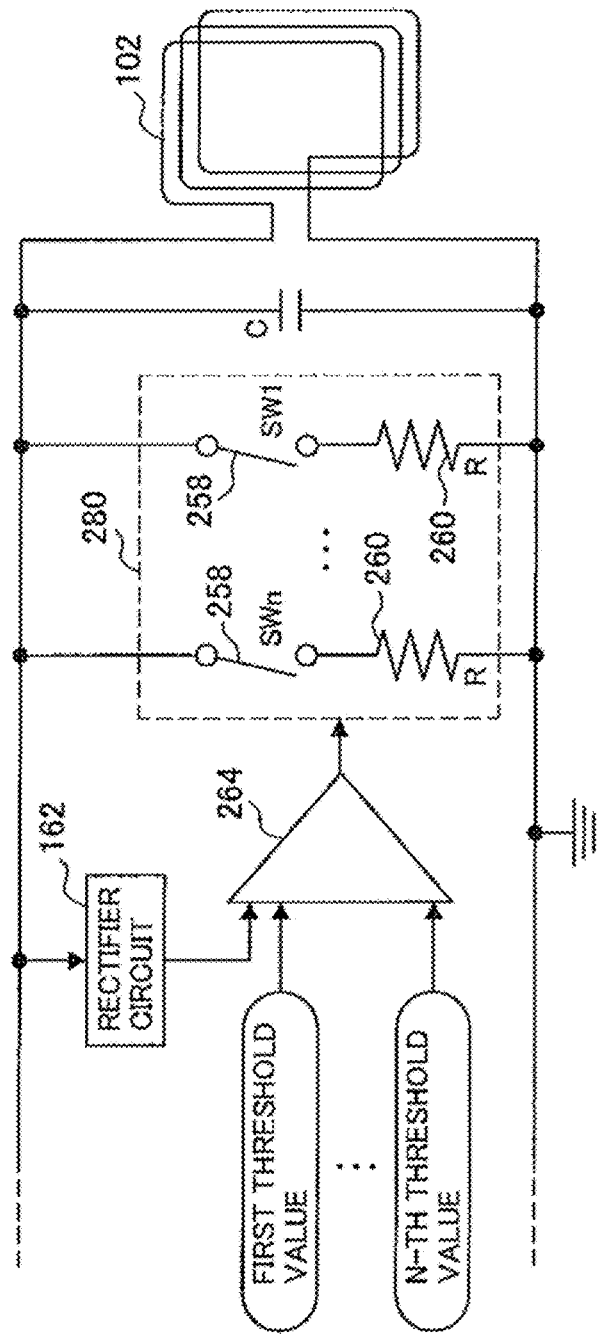
FIG. 10 is an explanatory diagram showing a circuit configuration example of the communication apparatus according to an embodiment.

(FIG. 10: Variant)

The load control circuit of multi-stage parallel resistance type will be described as a variant of the load control circuit according to the present embodiment with reference to FIG. 10. FIG. 10 is an explanatory diagram showing a variant of the load control circuit according to the present embodiment. Same reference numerals are denoted on the components substantially the same as the configuration of FIG. 9, and detailed description will be omitted to avoid redundant explanation.

As shown in FIG. 10, the load control circuit according to the present variant includes the characteristics control block 280, the rectifier circuit 162, and the comparator 264. The difference with the above load control circuit mainly lies in the difference in the configuration of the characteristics control block 280 and the comparator 264.

(Characteristics Control Block 280, Comparator 264)

The characteristics control block 280 is configured by a plurality of switches 258 (SW1 to SWn) and a plurality of resistances 260. One resistance 260 is connected in series to one switch 258. A set of the switch 258 and the resistance 260 is connected in parallel to each other. Thus, the amount of load to be added to the antenna 102 can be adjusted by changing the number of switch 258 to turn ON.

For instance, as shown in FIG. 5(B) or FIG. 6(B), when reaching one threshold value and exceeding the other threshold value immediately after the antenna characteristics are switched, the issue of again exceeding the former threshold value can be avoided by switching only some of the plurality of switches 258 that are turned OFF to ON. Alternatively, the switches 258 may be gradually switched to ON until immediately before reaching the other threshold value so as not to exceed the other threshold value when reaching the former threshold value.

The comparator 264 compares the antenna end voltage input from the rectifier circuit 162 with two or more plurality of threshold values (first threshold value to $n^{th}$ threshold value), and determines the number of switch 258 to switch ON so that the antenna end voltage after the switching of the antenna characteristics is positioned between the predetermined threshold values. The plurality of switches 258 may be switched in a predetermined order, or may be switched in an arbitrary order. For instance, when the resistance values of the plurality of resistances 260 differ from each other, the load of the antenna can be more efficiently switched by appropriately controlling the combination of switching the switches 258.

As described above, the load control circuit according to the present embodiment is realized by combining the switch 158, 258, the resistance 160, 260, and the comparator 164, 264. The load control of the antenna 102 is realized mainly by switching the switch 158, 258 in response to the signal input from the comparator 164, 264. In this case, the comparator 164, 264 controls the switch 158, 258 based on the control method described with reference to FIGS. 4, 5(B), and 6(B).

Specific Example 3

Specific Example Related to FIG. 9

Consider a case where the communication apparatus 100 on the reception side is the non-contact type IC card, and the transmission side is the reader/writer. In this case, the switch 158 is switched from OFF to ON and the resistance 160 is validated when the antenna end voltage of the reader/writer becomes lower than the first threshold value. As a result, the occurrence of the non-communicable state with the antennas closely coupled is avoided even if the intensity of the output magnetic field is reduced and the non-contact type IC card and the reader/writer are positioned at close range. Furthermore, when the antenna end voltage exceeds the second threshold value, the reader/writer invalidates the resistance 160 by switching the switch 158 to OFF. The intensity of the output magnetic field then increases, and the maximum communicable distance is maintained at greater than or equal to a predetermined value.

Specific Example 4

Specific Example Related to FIG. 10

Similar to the specific example 3, consider a case where the communication apparatus 100 on the reception side is the non-contact type IC card and the transmission side is the reader/writer. In this case, a plurality of sets of the switches 258 and the resistances 260 are connected in parallel at multi-stages. Thus, the reader/writer monitors the antenna end voltage, and switches the switches 258 so as to be at the resistance value corresponding to the relevant antenna end voltage. For instance, greater number of switches may be switched to ON as the non-contact type IC card becomes closer to the reader/writer and the antenna end voltage of the reader/writer lowers. The output magnetic field can be reduced by the number of switches 258 turned ON.

The function configuration, the circuit configuration example, and the method of setting the threshold values of the communication apparatus 100 according to the present embodiment have been described above. When the above-described configuration is applied, the entering of the non-communicable region in which the antennas are closely coupled is detected by the antenna end voltage between the communication apparatuses that non-contact communicate such as the reader/writer and the non-contact type IC card, and the formation of the non-communicable region can be avoided according to the detection result. Furthermore, the change in characteristics by the coupling between the antennas can be reduced with the exceeding (greater than or lower than) of the antenna end voltage of the threshold value set in advance as a trigger, whereby the formation of the communication disabled region can be avoided while maintaining the maximum communicable distance to greater than or equal to a predetermined value.

Configuration Example of Non-Contact Communication Apparatus

Figure 11:
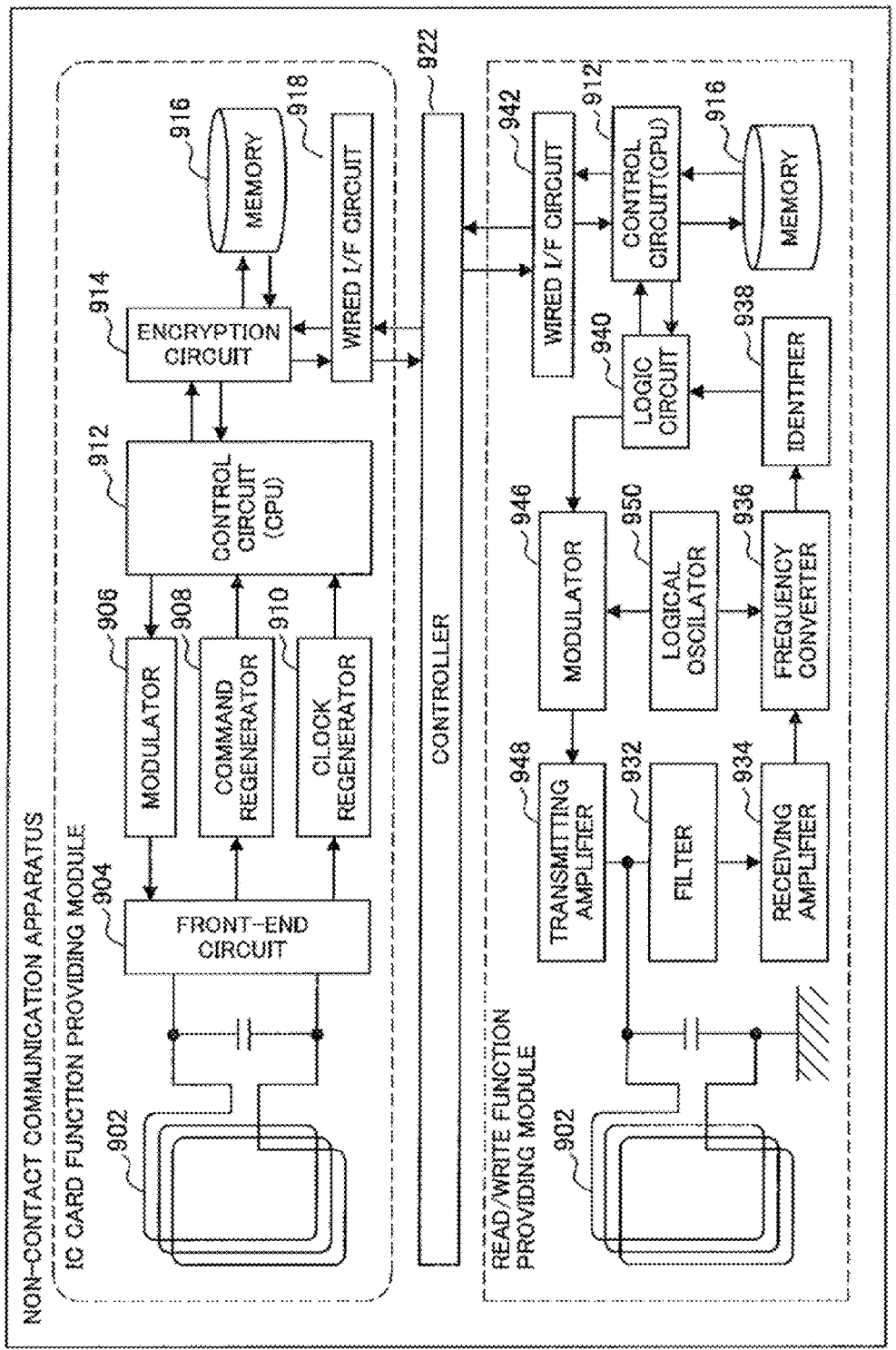
FIG. 11 is an explanatory diagram showing one example of an apparatus configuration of the non-contact communication apparatus.

Here, with reference to FIG. 11, a configuration example of a non-contact communication apparatus capable of realizing the functions of the apparatus described above will be briefly described. FIG. 11 is an explanatory diagram showing the configuration example of the non-contact communication apparatus. Incidentally, it is possible to have the functions of the apparatus described above realized by using only a part of the structural elements of the non-contact communication apparatus. Further, the structural elements denoted with the same reference numerals may be configured in a single hardware unit.

As shown in FIG. 11, the non-contact communication apparatus is mainly configured by an IC card function providing module, a read/write function providing module and a controller 922.

(IC Card Function Providing Module)

The IC card function providing module is configured by, for example, an antenna 902, a front-end circuit 904, a modulator 906, a command regenerator 908, a clock regenerator 910, a control circuit 912, an encryption circuit 914, a memory 916 and a wired interface circuit 918.

The antenna 902 is configured by a loop antenna and receives command and power by magnetically coupling with the loop antenna of a reader/writer and. The front-end circuit 904 rectifies a carrier transmitted from the reader/writer and regenerates direct-current power. Further, the front-end circuit 904 frequency-divides the obtained carrier of 13.56 MHz and inputs the same to the command regenerator 908 and the clock regenerator 910. The command regenerator 908 regenerates a command from the input carrier and inputs the same to the control circuit 912. The clock regenerator 910 regenerates a clock for driving a logic circuit from the input carrier and inputs the same to the control circuit 912. Further, the front-end circuit 904 supplies the regenerated power to the control circuit 912 (CPU).

When power is supplied to all the circuits, the control circuit 912 drives each circuit according to the regenerated command. Note that the data output from the control circuit 912 is encrypted by the encryption circuit 914 and stored in the memory 916. Note that the memory 916 may be a storage device storing information magnetically, optically or magneto-optically, for example, or it may be a semiconductor storage device used as a ROM (Read Only Memory), a RAM (Random Access Memory) and the like.

On the other hand, when transmitting the encrypted data stored in the memory 916, the front-end circuit 904 changes the load impedance at the feeding point of the antenna 902 based on the encrypted data modulated by the modulator 906 and, in response to the change, changes the magnetic field induced by the antenna 902. With the change in the magnetic field, the current change flowing through the antenna of the reader/writer magnetically coupled is induced, and the encrypted data is transmitted.

Further, the control circuit 912 may be controlled by the controller 922 via the wired interface circuit 918. Further, it may be possible for the IC card function providing module to transmit/receive information to/from a read/write function providing module described later via an interface I/F (not shown) and to mutually control each other or perform control of one to the other.

(Read/Write Function Providing Module)

The read/write function providing module is configured by, for example, an antenna 902, a filter 932, a receiving amplifier 934, a frequency converter 936, an identifier 938, a logic circuit 940, a control circuit 912, a memory 916, a wired interface circuit 942, a modulator 946, a local oscillator 950 and a transmitting amplifier 948.

The read/write function providing module provides command and supplies power by using the magnetic coupling with the non-contact type IC card and the like. The read/write function providing module, by the control of the control section 912 (CPU), supplies power to the non-contact type IC card and the like to activate it, and then, starts communication according to a predetermined transmission protocol. At this time, the read/write function providing module establishes a communication connection, performs the anti-collision processing, the authentication processing and the like.

The read/write function providing module generates a carrier by using the local oscillator 950. When transmitting information, first, the control circuit 912 reads data from the memory 916 and transmits the data to the logic circuit 940. Then, the modulator 946 modulates the carrier generated by the local oscillator 950 based on the signal output from the logic circuit 940. Further, the transmitting amplifier 948 amplifies the modulated wave output from the modulator 946 and transmits the wave via the antenna 902.

On the other hand, when receiving information, first, the modulated wave received via the antenna 902 is input to the receiving amplifier 934 after being passed through the filter 932. Then, the signal amplified by the receiving amplifier 934 is frequency-converted by the frequency converter 936 and is input to the logic circuit 940. Further, the signal output from the logic circuit 940 is stored in the memory 916 by the control circuit 912. Or, the signal is transmitted to the external controller 922 via the wired interface circuit 942.

The apparatus configuration example of the non-contact communication apparatus has been described above. The non-contact communication apparatus may be mobile telephones, portable information terminals, various communication apparatuses, information processing devices such as personal computer, or game machines and information home electronics. Various apparatuses incorporating some or all of the functions or the components of the non-contact communication apparatus described above are also encompassed in the technical scope of the above-described embodiments. It should be recognized that the program for causing a computer to realize the function of each component, and a recording medium recorded with such program are also encompassed in the technical scope of the above-described embodiments.

[Determination/Change Timing of Antenna Characteristics]

Figure 12:
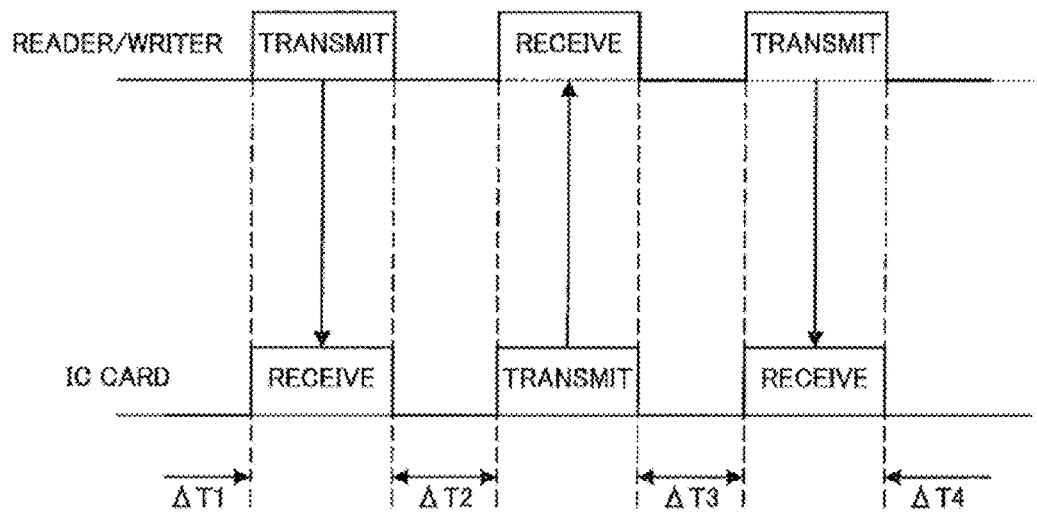
FIG. 12 is an explanatory diagram showing the determination/change timing of the antenna characteristics according to an embodiment.

The determination/change timing of the antenna characteristics according to the present embodiment will now be described with reference to FIG. 12. FIG. 12 is an explanatory diagram showing the determination/change timing of the antenna characteristics according to the present embodiment. In FIG. 12, a transmission/reception timing on the reader/writer side and a transmission/reception timing on the non-contact type IC card side corresponding to such transmission/reception timing are schematically shown. The horizontal axis of FIG. 12 shows elapsed time towards the right.

In this case, the characteristics control unit 108 controls the transmission/reception timing and the change timing of the antenna characteristics so as not to overlap. The characteristics control unit 108 determines whether or not to change the antenna characteristics at an arbitrary timing. That is, the characteristics control unit 108 changes the antenna characteristics when change is desired in the period in which the transmission/reception is not being performed ($\Delta Tn(n=1, 2, 3, 4, \ldots)$). However, the determination period of the antenna characteristics and the changing period of the antenna characteristics may not be the same. According to such configuration, the signal in transmission/reception will not be broken.

For instance, the configuration of varying the load of the antenna by the switch has been described by way of example for the load control circuit, but is not limited thereto. A variable resistance circuit for continuously changing the load of the antenna may be used in place of the switch.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A communication apparatus comprising:
a voltage detection unit for detecting an antenna end voltage of a reader/writer or a non-contact type IC card when non-contact communicating using a load modulation of the non-contact type IC card with respect to a magnetic field signal from the reader/writer; and
a characteristics control unit for changing characteristics of an antenna of the reader/writer or the non-contact type IC card when the antenna end voltage detected by the voltage detection unit reaches a predetermined first threshold value,
wherein the characteristics control unit only changes the characteristics of the antenna at a timing transmission and reception of data are not being performed, and the characteristics control unit controls transmission and reception of the data to not overlap with a timing the characteristics of the antenna are changed by changing the characteristics of the antenna after a first transmission of the data and a first reception of the data and prior to a second transmission of the data and a second reception of the data, such that the characteristics control unit is configured to control changing the characteristics of the antenna to avoid formation of a non-communicable region while maintaining a communicable distance.

2. The communication apparatus according to claim 1, wherein the characteristics control unit restores the characteristics of the antenna to a state before change when the antenna end voltage reaches a predetermined second threshold value after changing the characteristics of the antenna when the antenna end voltage reaches the predetermined first threshold value.

3. The communication apparatus according to claim 2, wherein the predetermined second threshold value is set to a value farther from the predetermined first threshold value than the antenna end voltage immediately after the characteristics of the antenna are changed by the characteristics control unit.

4. The communication apparatus according to claim 3, wherein the predetermined first threshold value is set to a value farther from the predetermined second threshold value than the antenna end voltage immediately after the characteristics of the antenna are restored to the state before change by the characteristics control unit.

5. The communication apparatus according to claim 1, further comprising a switch for adding a resistance to the antenna, wherein
the characteristics control unit changes the characteristics of the antenna by switching ON/OFF of the switch.

6. The communication apparatus according to claim 2, further comprising a plurality of switches, independent from each other, for adding a plurality of resistances in parallel to the antenna; wherein
the characteristics control unit changes the characteristics of the antenna by switching ON/OFF some or all of the plurality of switches such that the antenna end voltage does not reach the predetermined second threshold value immediately after the characteristics of the antenna are changed when the antenna end voltage reaches the predetermined first threshold value.

7. The communication apparatus according to claim 2, further comprising a plurality of switches, independent from each other, for adding a plurality of resistances in parallel to the antenna, wherein
the characteristics control unit changes the characteristics of the antenna by switching ON/OFF some or all of the plurality of switches when the antenna end voltage reaches the predetermined second threshold value immediately after the characteristics of the antenna are changed when the antenna end voltage reaches the predetermined first threshold value.

8. The communication apparatus according to claim 1, wherein the characteristics control unit determines whether or not to change the characteristics of the antenna at an arbitrary timing.

9. The communication apparatus according to claim 2, wherein the characteristics control unit changes the characteristics of the antenna when the antenna end voltage is greater than the predetermined first threshold value, or restores the characteristics of the antenna to the state before change when the antenna end voltage is smaller than the predetermined second threshold value.

10. The communication apparatus according to claim 2, wherein the characteristics control unit changes the characteristics of the antenna when the antenna end voltage is smaller than the predetermined first threshold value, or restores the characteristics of the antenna to the state before change when the antenna end voltage is greater than the predetermined second threshold value.

11. A method of controlling antenna characteristics, the method comprising the steps of:
- detecting an antenna end voltage of a reader/writer or a non-contact type IC card when communicating using a load modulation of the non-contact type IC card with respect to a magnetic field signal from the reader/writer; and
- controlling characteristics of an antenna of the reader/writer or the non-contact type IC card when the antenna end voltage detected in the voltage detecting step reaches a predetermined threshold value,
- wherein the characteristics of the antenna are only changed at a timing transmission and reception of data are not being performed, and transmission and reception of the data do not overlap with a timing the characteristics of the antenna are changed, which is after a first transmission of the data and a first reception of the data and prior to a second transmission of the data and a second reception of the data, such that changing the characteristics of the antenna is controlled to avoid formation of a non-communicable region while maintaining a communicable distance.

12. The communication apparatus according to claim 1, wherein the predetermined first threshold value is set to a value smaller than a predetermined antenna end voltage in a non-communicable region formed at a predetermined non-contact communication distance.

13. The communication apparatus according to claim 1, wherein the characteristics control unit changes the characteristics of the antenna of the reader/writer.

* * * * *